(12) United States Patent
Hsu et al.

(10) Patent No.: US 10,723,664 B1
(45) Date of Patent: Jul. 28, 2020

(54) STABLE METAL PHOSPHITE COMPOSITION

(71) Applicant: JH Biotech, Inc., Ventura, CA (US)

(72) Inventors: Hsinhung John Hsu, Camarillo, CA (US); Franz Fernandez, Ventura, CA (US)

(73) Assignee: JH BIOTECH, INC., Ventura, CA (US)

( * ) Notice: Subject to any disclaimer, the term of this patent is extended or adjusted under 35 U.S.C. 154(b) by 18 days.

(21) Appl. No.: 16/229,947

(22) Filed: Dec. 21, 2018

Related U.S. Application Data

(60) Provisional application No. 62/608,789, filed on Dec. 21, 2017.

(51) Int. Cl.
*C05B 17/00* (2006.01)
*A01N 59/26* (2006.01)
*C01B 25/163* (2006.01)
*C05D 9/02* (2006.01)

(52) U.S. Cl.
CPC .............. *C05B 17/00* (2013.01); *A01N 59/26* (2013.01); *C01B 25/163* (2013.01); *C05D 9/02* (2013.01)

(58) Field of Classification Search
None
See application file for complete search history.

(56) References Cited

U.S. PATENT DOCUMENTS

| | | | | |
|---|---|---|---|---|
| 5,514,200 A * | 5/1996 | Lovatt | ........................ | C05B 7/00 71/11 |
| 5,800,837 A * | 9/1998 | Taylor | ........................ | C05B 7/00 424/601 |
| 6,168,643 B1 * | 1/2001 | Hsu | ........................ | C05B 13/06 71/32 |
| 6,338,860 B1 * | 1/2002 | Taylor | ........................ | C05B 7/00 424/601 |
| 6,770,593 B1 * | 8/2004 | Williams | ................ | C05B 17/00 504/101 |
| 8,216,972 B1 * | 7/2012 | Fabry | ........................ | C05B 13/00 504/101 |
| 9,663,409 B2 * | 5/2017 | Fanning | ................... | C05B 17/00 |
| 2002/0129632 A1 * | 9/2002 | Sheppardson | ............. | C05B 7/00 71/27 |
| 2002/0193351 A1 * | 12/2002 | Taylor | ..................... | A01N 37/44 514/114 |
| 2003/0029211 A1 * | 2/2003 | Sheppardson | ........... | C05B 17/00 71/33 |
| 2003/0061850 A1 * | 4/2003 | Young | ........................ | C05B 7/00 71/34 |
| 2004/0035162 A1 * | 2/2004 | Williams | .................. | C05D 9/00 71/28 |
| 2004/0224845 A1 * | 11/2004 | Forsyth | .................... | C05B 17/00 504/194 |
| 2005/0119124 A1 * | 6/2005 | Alyeshmerni | .......... | A01N 59/02 504/116.1 |
| 2005/0268679 A1 * | 12/2005 | Josef | ......................... | C05B 7/00 71/31 |
| 2006/0063675 A1 * | 3/2006 | Dean | ....................... | A01N 59/04 504/101 |
| 2008/0105018 A1 * | 5/2008 | Grech | ........................ | C12P 3/00 71/7 |
| 2011/0183843 A1 * | 7/2011 | Fabry | ....................... | C05B 17/00 504/101 |
| 2013/0034613 A1 * | 2/2013 | Kok | ............................ | C05G 3/60 424/601 |
| 2013/0210624 A1 * | 8/2013 | Stringfellow | ........... | A01N 59/26 504/101 |

\* cited by examiner

*Primary Examiner* — Wayne A Langel
(74) *Attorney, Agent, or Firm* — Ralph D Chabot

(57) ABSTRACT

A stable metal phosphite composition made from water, phosphorous acid ($H_3PO_3$), a metal salt and a sufficient a quantity of liquid ammonium hydroxide ($NH_4OH$) where the molar ratio of ammonium ions to metal ions is 1-4 moles ammonium to 1 mole metal. The composition can be diluted for use-application providing beneficial nutrients for plant uptake.

6 Claims, No Drawings

STABLE METAL PHOSPHITE COMPOSITION

BACKGROUND OF THE INVENTION

Phosphite type compounds, in both acid and salt forms, are known to be not only effective pesticides (fungicides), but also slow release fertilizers. For example, phosphorous acid is well known to possess both fungicidal and plant nutrition properties. Application to the soil or by foliar application, phosphite type products unfortunately become oxidized into phosphates and thereby lose their activity as a fungicide; thus becoming a traditional phosphate fertilizer.

Fungicidal activity is the most valuable characteristic of phosphite type products. Fungal diseases are an important concern when considering the potential for significant harm to plants. Because of this concern, it is most desirable to maintain at least a minimal pre-determined concentration of phosphite present in plant tissue to provide a level of continuous plant protection from fungal infestation.

Copper is known as a bactericide and fungicide as well as a plant nutrient. However, copper salts are known to cause plant phytotoxicity. As a rule, phytotoxicity of copper salts depends on the pH of the composition available to the plant. The lower the pH, the higher the risk of phytotoxicity. It is desirable if phosphorus and copper can be applied together to reduce the labor costs associated with separate applications.

It is not uncommon for plants to contract diseases caused by both fungi and bacteria. Application of a suitable amount of phosphorous acid with copper may simultaneously cure the diseases caused by both fungi and bacteria. However, mixing both phosphorous acid and copper together for field application is problematic. Mixing phosphorous acid with copper results in a product having a low pH which is phytotoxic to plants. However, if the product is adjusted to a higher pH, such as 6.5 or higher using potassium hydroxide, the product will form insoluble precipitates of copper hydroxide and copper phosphite.

The pH is an important factor that affects phosphite and the fungicidal effectiveness of other products when applied to plants. The pH range that provides the highest activity for a phosphite type fungicide, is between about 6.3-7.5. At the same time, pH of water in different areas of agricultural activities varies from slightly acidic (5.0-5.5) to slightly alkaline (8.5-9.0).

In experimental Agrochemistry, less damage occurs to plants by foliar application of copper containing compositions having a pH greater than 6.0. The inconvenience of this approach is the formation of water insoluble forms of copper compounds which become suspended in solution. Rather than this approach, it would be most desirable to provide a multifunctional composition containing copper at a pH above 7.0.

SUMMARY OF THE INVENTION

A stable metal phosphite solution has been developed which resists oxidation into phosphate compositions. The solution is devoid of precipitates and provides: a) ammonia ions; b) phosphite ions and their anti-fungal properties; and, c) copper ions and their anti-fungal properties; available for plant uptake.

The composition is blended using: phosphorous acid ($H_3PO_3$); a metal salt, preferably copper sulfate ($CuSO_4$); and ammonium hydroxide ($NH_4OH$) to obtain a pH of at least 6.5. A sufficient quantity of liquid ammonium hydroxide ($NH_4OH$) is blended where the molar ratio of ammonium to metal is 1-4 moles ammonium to 1 mole metal ion to maintain phosphite in solution.

One example has a weight ratio of ammonium to metal ion of between 0.9-1.1. The stable metal phosphite composition is made from ingredients comprising: 4-8 parts water, 1-3 parts phosphorous acid ($H_3PO_3$) and 0.5-1.5 parts metal salt, preferably copper sulfate ($CuSO_4$) by weight; and 0.5-1.5 parts 26% liquid ammonium hydroxide ($NH_4OH$) to create a composition having a pH between 6.5-7.5. This composition can thereafter be diluted with 75-150 times water for either germination of seeds or foliar application to plants.

Another example is a composition having a combination of $NH_4OH$ and $KOH$ to increase the pH to between 6.5-7.5. For this combination, $NH_4OH$ must be separately added to the metal salt and ($H_3PO_3$) before $KOH$ is added. Use of ammonium ions must be present in a relationship of between 1-4 moles ammonium to one mole metal ion to maintain phosphite in solution.

In an alternative embodiment, potassium hydroxide ($KOH$) can be used to increase pH if a complexing agent is added to the metal salt and ($H_3PO_3$). Preferably, the complexing agent is HEDP (Hydroxyethyl diphosphonic acid). The complexing agent will prevent the precipitation of phosphite and the metal at pH above 6.5 and should be present in a relationship of 0.5-1 mole complexing agent to one mole metal ion to maintain phosphite in solution. Complexing agents are an ion, molecule, or a functional group that can bind with a metal ion through one or several atoms to form a large complex. A complexing agent can have one or more bonding sites.

The metal salt is selected from the group consisting of: copper sulfate, copper carbonate, copper oxide, copper hydroxide, copper chloride, copper nitrate, copper citrate, copper gluconate, cupric acetate, cupric citrate, cupric oxide, cupric glycinate, cupric lysinate, cupric sulfide, or combinations thereof.

The complexing agent is selected from the group comprising ammonia, HEDP (Hydroxyethyl diphosphonic acid), HPAA (2 Hydroxy phosphonoacetic acid), DTPMPA (Diethylene triamine pentamethylene phosphonic acid), ATMP (Amino trimethylene phosphonic acid), PBTC (2 Phosphonobutane-1,2,4 tricarboxylic acid), and EDTA (Ethylenediaminetetraacetic acid).

Another beneficial property of the composition described above is its compatibility with metal cations; i.e. no precipitate formation. A precipitate-free solution provides more beneficial metal ions for use-application such as treatment of seeds or foliar application thus providing both the nutritional benefit which metal ions can provide as well as the fungicidal protection offered by phosphite. The presence of an effective amount of either ($NH_4OH$) or a complexing agent can maintain metal ions in a phosphite solution, minimize or eliminate precipitation thereby allowing both phosphite and metal ions to be available for plant absorption.

DETAILED DESCRIPTION OF THE PREFERRED EMBODIMENT

Eleven 100 gram compositions were blended with the ingredients indicated in Table 1 below. Each composition comprises: water, $H_3PO_3$, and, the metal salt $CuSO_4$. A complexing agent HEDP is used with KOH and $NH_4OH$ are used in four of the samples.

Either $NH_4OH$ and/or $KOH$ are used to increase the solution pH to approx. 6.5 in each of the samples with the exception of Sample # I.

TABLE 1

Sample Composition (grams)

| Materials | I | II | III | IV | V | VI | VII | VIII | IX | X | XI |
|---|---|---|---|---|---|---|---|---|---|---|---|
| Water | 63 | 24 | 6 | 59 | 20 | 2 | 6 | 18 | 23 | 3 | 67 |
| Phosphorous Acid | 25 | 25 | 25 | 15 | 15 | 15 | 23 | 25 | 25 | 25 | 9 |
| Copper Sulfate | 12 | 12 | 12 | 12 | 12 | 12 | 12 | 12 | 8 | 12 | 4 |
| Potassium Hydroxide (50%) | — | 39 | — | — | 39 | — | — | 25 | 24 | — | — |
| Ammonium Hydroxide (26%) | — | — | 57 | — | — | 57 | 57 | 20 | 20 | 60 | 20 |
| HEDP | — | — | — | 14 | 14 | 14 | 2 | — | — | — | — |

A traditional complexing agent, HEDP, is used without a base (# IV), and blended with KOH (# V) and $NH_4OH$ (# VI & # VII).

The amount of base added in the compositions above was to achieve a pH for the respective sample of 6.5 with the exception of (# X & # XI) which yielded pH values of 7.0 and 6.6 respectively.

The purpose of Tables 1 & 2 is to establish a range of base concentration relative to the metal salt in which no precipitates would form when pH is increased to at least 6.5. Samples # VIII-# XI were only used for this purpose and are not included in the subsequent Phototoxicity or Germination tests.

TABLE 2 pH and Appearance of Samples

| | I | II | III | IV | V | VI | VII | VIII | IX | X | XI |
|---|---|---|---|---|---|---|---|---|---|---|---|
| pH | 0.5 | 6.5 | 6.5 | 0.8 | 6.5 | 6.5 | 6.5 | 6.5 | 6.5 | 7.0 | 6.6 |
| Appearance | Clear Blue | Not Clear Blue | Clear Blue | Clear Blue | Clear Blue | Clear Blue | Clear Blue | Clear Blue | Clear Blue | Clear Blue | Clear Blue |
| Precipitation | No | Yes | No | No | No | No | No | No | No | No | No |

Phytotoxicity Tests

Samples # I-# VII were each diluted with 100 times water and sprayed onto leaves of crops until the solution started to drip from the leaves. Phytotoxicities were observed 3 days after spraying.

TABLE 3

Phytotoxicity Test Results
Phytotoxicity Rating

| Sample No. | Strawberry | Celery | Lettuce | Spinach |
|---|---|---|---|---|
| I | 6 | 7 | 6 | 7 |
| II | 2 | 2 | 1 | 2 |
| III | 0 | 0 | 0 | 1 |
| IV | 6 | 6 | 5 | 7 |
| V | 1 | 1 | 1 | 1 |
| VI | 0 | 0 | 0 | 1 |
| VII | 0 | 1 | 0 | 0 |

Rating

0—No injury

1—Very slight injury or symptoms of yellowing and deformation

2—Signs of slight injury

3—Recognized plant injury

4—Damage more severe but no necrosis

5—Scorching on the edges of the leaves or severe deformation

6—Extensive severe leaf scorch or leaf deformation

7—Over 50% of the leaves indicate scorch or deformation

8—Over 90% of the leaves destroyed

9—Extremely severe damage

10—Complete kill

Without ammonium or potassium supplied from a base, Samples # I and # IV had the highest phytotoxicity due to the acidity of the spray.

KOH samples # II and # V were improved. The better results for Sample # V result from the use of a complexing agent to prevent copper precipitate formation. $NH_4OH$ samples # III, # VI and # VII showed almost no phytotoxicity. The addition of the HEDP complexing agent in samples # VI &# VII showed no significant improvement when compared to the use of $NH_4OH$ alone.

Germination Tests

TABLE 4

Germination Test Results
Germination (%)

| Sample No. | Corn | Soybean | Green Bean | Wheat |
|---|---|---|---|---|
| I | 4 | 3 | 2 | 1 |
| II | 6 | 6 | 7 | 6 |
| III | 8 | 9 | 9 | 8 |
| iv | 5 | 4 | 3 | 4 |
| V | 9 | 7 | 9 | 8 |
| VI | 9 | 9 | 8 | 9 |
| VII | 9 | 9 | 9 | 8 |

Samples were diluted with 100 times water. Ten seeds were sowed in each pot. After sowing, 20 millimeters of the diluted products were sprayed into each of the pots. Results were observed 10 days after sowing.

Without ammonium or potassium supplied from a base, Samples # I and # IV showed the lowest germination rate.

KOH samples # II and # V showed improvement. The greater improved results were for Sample # V which included the HEDP complexing agent.

NH4OH samples # III, # VI and # VII showed performance on the same level as Sample # V. However, the addition of HEDP as a complexing agent did not influence results in which NH4OH was used (# III & # VI).

From the above tests, $NH_4OH$ provided a stable composition having no precipitates at pH 6.5 having minimal phototoxicity when used as a use-dilution solution and resulting in improved germination which is indicative of nutrient transfer.

A complexing agent such as HEDP is not necessary and does not improve germination performance when used in combination with ammonium hydroxide.

We claim:

1. A stable metal phosphite composition comprising:
    4-8 parts water, 1-3 parts phosphorous acid ($H_3PO_3$), 0.5-1.5 parts copper sulfate ($CUSO_4$) by weight and 0.5-1.5 parts liquid ammonium hydroxide ($NH_4OH$) having a pH between 6.5-7.5.

2. The composition of claim 1 which is diluted between 75-150 times water to form a solution for use-application.

3. A stable metal phosphite composition comprising:
    4-8 parts water, 1-3 parts phosphorous acid ($H_3PO_3$), 0.5-1.5 parts copper sulfate ($CUSO_4$) by weight and a sufficient quantity of liquid ammonium hydroxide where the molar ratio of ammonium to copper is 1-4 moles ammonium to 1 mole copper.

4. The composition of claim 2 which is diluted between 75-150 times water to form a solution for use-application.

5. A stable metal phosphite composition comprising:
    4-8 parts water, 1-3 parts phosphorous acid ($H_3PO_3$), 0.5-1.5 parts metal salt by weight and a sufficient quantity of liquid ammonium hydroxide ($NH_4OH$) where the molar ratio of ammonium to metal is 1-4 moles ammonium to 1 mole metal; and where said metal salt is selected from the group consisting of: copper sulfate, copper carbonate, copper oxide, copper hydroxide, copper chloride, copper nitrate, copper citrate, copper gluconate, cupric acetate, cupric citrate, cupric oxide, cupric glycinate, cupric lysinate, cupric sulfide and combinations thereof.

6. The composition of claim 5 which is diluted between 75-150 times water to form a solution for use-application.

* * * * *